US009796002B2

(12) United States Patent
Lu et al.

(10) Patent No.: US 9,796,002 B2
(45) Date of Patent: Oct. 24, 2017

(54) PARTICLE REMOVAL USING PERIODIC PIEZOELECTRIC COEFFICIENT MATERIAL

(75) Inventors: Yanqing Lu, Jiangsu (CN); Xikui Hu, Jiangsu (CN); Fei Xu, Jiangsu (CN); Wei Hu, Jiangsu (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1087 days.

(21) Appl. No.: 13/817,357

(22) PCT Filed: Mar. 5, 2012

(86) PCT No.: PCT/CN2012/071936
§ 371 (c)(1),
(2), (4) Date: Feb. 15, 2013

(87) PCT Pub. No.: WO2013/131233
PCT Pub. Date: Sep. 12, 2013

(65) Prior Publication Data
US 2013/0239989 A1 Sep. 19, 2013

(51) Int. Cl.
*B08B 7/02* (2006.01)
*B01D 51/08* (2006.01)

(52) U.S. Cl.
CPC .................................... *B08B 7/026* (2013.01)

(58) Field of Classification Search
CPC .......................... B08B 7/026; G01N 2015/142
USPC ............................................................. 134/1
See application file for complete search history.

(56) References Cited

U.S. PATENT DOCUMENTS 3,301,535 A * 1/1967 Brown ...................... B08B 3/12 134/184
4,319,891 A 3/1982 Anderson et al.
4,475,921 A 10/1984 Barmatz et al.
5,161,764 A * 11/1992 Roney ................ A61M 5/1415 248/218.4
5,178,134 A * 1/1993 Vago ................. A61H 23/0245 600/439
6,216,538 B1 * 4/2001 Yasuda ................ B01D 21/283 210/748.05
6,276,370 B1 * 8/2001 Fisch ........................ B08B 3/12 134/1.3

(Continued)

FOREIGN PATENT DOCUMENTS

CN 201470244 U * 5/2010

OTHER PUBLICATIONS

Machine translation of CN201470244U dated May 2010.*

(Continued)

*Primary Examiner* — Douglas Lee
(74) *Attorney, Agent, or Firm* — Moritt Hock & Hamroff LLP; Steven S. Rubin, Esq.

(57) ABSTRACT

Technologies are generally described for systems and methods effective to implement particle removal. In one example, a method for at least partially removing particles from a region is generally described. In some examples, the method includes applying an electric field to a material to produce an acoustic wave from the material. The material may have a periodic piezoelectric coefficient. The method may include applying the acoustic wave to the region to produce an agglomeration. The agglomeration may include at least two of the particles. The method may further include at least partially removing the agglomeration from the region.

21 Claims, 4 Drawing Sheets

(56) References Cited

U.S. PATENT DOCUMENTS

| | | | | |
|---|---|---|---|---|
| 6,782,875 | B2 | 8/2004 | Yoshimoto | |
| 6,975,402 | B2 | 12/2005 | Bisson et al. | |
| 2002/0162393 | A1 * | 11/2002 | Kaduchak | B01D 49/006 73/570.5 |
| 2003/0008418 | A1 * | 1/2003 | Eason | C30B 33/00 438/3 |
| 2003/0200864 | A1 | 10/2003 | Meegan et al. | |
| 2008/0018199 | A1 * | 1/2008 | Trolier-McKinstry | B06B 1/0629 310/311 |
| 2008/0245709 | A1 * | 10/2008 | Kaduchak | B01D 21/283 209/599 |
| 2009/0039806 | A1 | 2/2009 | Kudo | |

OTHER PUBLICATIONS

W. B. Case et al., Realization of optical carpets in the Talbot and Talbot-Lau configurations, Opt Express, 2009, 20966-20974, 17.

Y. Zhang et al., Nonlinear Talbot Effect, Phys. Rev. Lett., 2010, 183901, 104.

Y. Q. Lu, Optical Properties of an ionic-type phononic crystal, Science, 1999, 1822-1824, 284.

Y. Q. Lu, et al., Electro-optic effect of periodically poled optical superlattice LiNbO3 and its applications, Appl. Phys. Lett., 2000, 3719-3721, 77.

A. W. Warner et al. Determination of Elastic and Piezoelectric Constants for Crystals in Class (3m), J. Acoust. Soc. Am., 1967, 1223-1231, 42.

W. J. Xie & B. Wei, Parametric study of single-axis acoustic levitation, Appl. Phys. Lett., 2001, 881-883, 79.

B.J. Thomas et al., Barrierless Ultrasonic Air Cleaner, RD & E Center Technical Report, Jan. 1988, ADA204237, 47 pages.

International Search Report for application with application No. PCT/CN2012/071936, dated Dec. 6, 2012, 4 pages.

Periodic Poling, Wikipedia, retrieved from http://en.wikipedia.org/wiki/Periodic_poling, dowloaded on Feb. 6, 2013, 1 page.

* cited by examiner

PARTICLE REMOVAL USING PERIODIC PIEZOELECTRIC COEFFICIENT MATERIAL

CROSS REFERENCE TO RELATED APPLICATION

This application is a U.S. National Stage filing under 35 U.S.C. §371 of International Application No. PCT/CN2012/071936 filed Mar. 5, 2012, the entirety of which is hereby incorporated by reference.

BACKGROUND

Unless otherwise expressly indicated herein, none of the material presented in this section is prior art to the claims of this application and is not admitted to be prior art by having been included herein.

Manufacturing and chemical processes may produce desired products including undesired particles. The products and the particles may be fed to a filter. The filter may be used to remove at least some of the undesired particles from the product.

SUMMARY

In one example, a method for at least partially removing particles from a region is generally described. In some examples, the method includes applying an electric field to a material to produce an acoustic wave from the material. The material may have a periodic piezoelectric coefficient. The method may include applying the acoustic wave to the region to produce an agglomeration. The agglomeration may include at least two of the particles. The method may further include at least partially removing the agglomeration from the region.

In another example, a device effective to at least partially remove particles from a region is generally described. The device may include an electric field source effective to produce an electric field. The device may further include a material in communication with the electric field. The material may be effective to receive the electric field and produce an acoustic wave in response. The material may have a periodic piezoelectric coefficient. The acoustic wave may be effective to be applied to the region to produce an agglomeration. The agglomeration may include at least two of the particles.

In another example, a system effective to at least partially remove particles from a region is generally described. The system may include an electric field source effective to produce an electric field. The system may further include a material in communication with the electric field source. The material may be effective to receive the electric field and produce an acoustic wave in response. The material may have a periodic piezoelectric coefficient. A region may be in acoustic communication with the material. The region may be effective to receive the acoustic wave. The region may include particles and at least one agglomeration. The agglomeration may include at least two of the particles.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION

Figure 1:
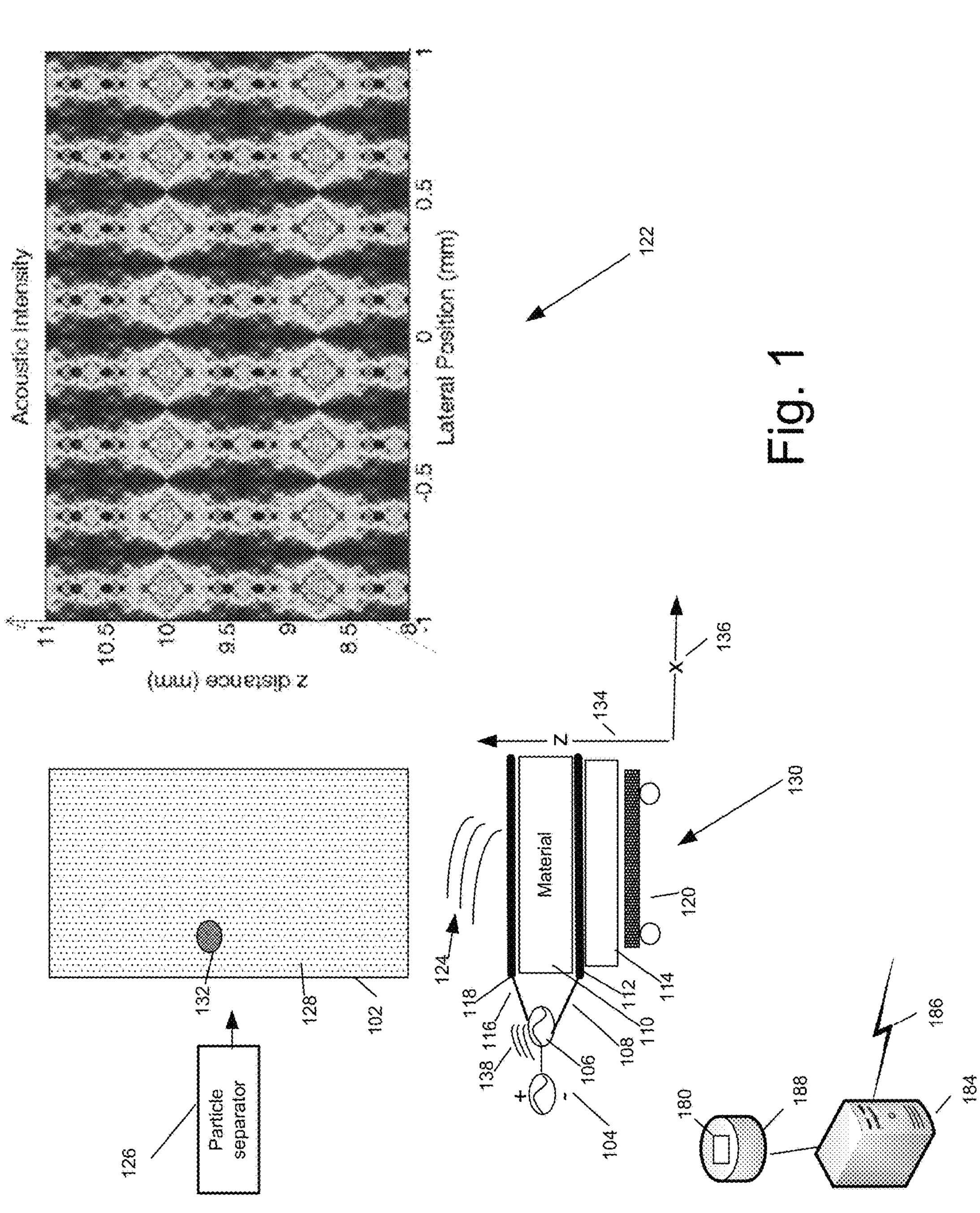
FIG. 1 illustrates an example system that can be used to implement particle removal.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be used and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

This disclosure is generally drawn, among other things, to apparatuses, systems, devices and methods relating to particle removal.

Briefly stated, technologies are generally described for systems and methods effective to implement particle removal. In one example, a method for at least partially removing particles from a region is generally described. In some examples, the methods include applying an electric field to a material to produce an acoustic wave from the material. The material may have a periodic piezoelectric coefficient. The method may include applying the acoustic wave to the region to produce an agglomeration. The agglomeration may include at least two of the particles. The method may further include at least partially removing the agglomeration from the region.

FIG. 1 illustrates an example system that can be used to implement particle removal arranged according to at least some embodiments described herein. A particle removal system 100 may include a particle removal device 130. Particle removal device 130 may include a power source 104, an electric field source 106, electrodes 112, 118 and/or a material 110 with a periodic piezoelectric coefficient. Electric field source 106 may be in communication with material 110 through electrodes 112, 118 and leads 108, 116. Electrodes 112, 118 and material 110 may be supported by a support 114 and may be in contact with a movable table 120. At least some of the elements of the particle removal system 100 may be arranged in communication with a processor 184 through a communication link 186. In some examples, processor 184 may be adapted in communication with a memory 188 that may include instructions 180 stored therein. Processor 184 may be configured, such as by instructions 180, to control at least some of the operations/actions/functions described below.

As described in more detail below, electric field source 106 may be configured to apply an electric field 138 to material 110 to produce an acoustic wave 124. Acoustic wave 124 may have areas of pressure minima and pressure maxima effective to produce an acoustic Talbot effect in a region 102 Particles in region 102 may agglomerate in the pressure minima to produce particle agglomeration 132. Further, by moving table 120, the areas of pressure minima and maxima may be effective to further agglomerate particles 128 in region 102. Agglomerated particles 132 may then be at last partially removed by moving table 120 and/or through use of a particle separator 126 such as a cyclone particle separator.

Material 110 may be a material with a periodically piezoelectric coefficient. Material 110 may be an acoustic superlattice or a piezoelectric superlattice. Material 110 may be, for example, periodically poled lithium niobate ($LiNbO_3$), periodically poled lithium tantalate ($LiTaO_3$), periodically poled potassium totanyl phosphate ($KTiOPO_4$), periodically poled rubidium titanyl arsenate ($RbTiOAsO_4$), periodically poled Barium Sodium Niobate ($Ba_2Na$—$Nb_5O_{15}$), or combinations thereof. Material 110 may be for example, periodically poled $LiNbO_3$ with a width of about 0.05 mm to about 10 mm and a length of about 10 mm to about 100 mm.

Electrodes 112, 118 may be conductive films such as gold or aluminium films, or indium tin oxide. Leads 108, 116 may be metal wires welded to electrodes 112, 118. For example, leads 108, 116 may be conductive such as aluminium, copper, etc. Leads 108, 116 may be in communication with electric field source 106 such as through a radio frequency cable. A distance between electrodes 112, 118 may correspond to a thickness of material 110 such as, for example, in a range of about 0.1 mm to about 4 mm.

In some examples, particles 128 may be a particle of any shape, including but not limited to, spheroid, oblong, polygonal, and globular structure and/or material such as, but not limited to metals, inorganics, ceramics, organics, organometallics, polymers, biochemicals, and biologicals, or combination of materials and have all three physical dimensions within the range of about 1 nm to about 100 nm. In some examples, particles 128 may have physical dimensions of about 1 μm to about 100 μm. Particle agglomeration 132 may have one or more physical dimensions of about 100 nm and about 1000 nm.

Power source 104 may produce an alternating current effective to provide power for electric field source 106. Electric field source 106 may produce an electric field at a frequency of, for example, about 1 MHz to about 100 MHz such as 7.2 MHz and may result in acoustic waves 124 at a frequency of, for example, about 1 MHz to about 100 MHz such as 7.2 MHz. In an example, an electric field may be less than the material's coercive field such as about 20 kV/mm for $LiNbO_3$. Electric field source 106 may be selected to generate an electric field at a frequency based on a resonance frequency of material 110. Power source 104 may be effective to produce alternating current from an alternating voltage of about 110 volts at about 60 Hz.

Electric field 138 may be communicated through leads 108 and 116 to electrodes 112, 118. Electric field 138 may produce a periodic and discontinuous change in the piezoelectric coefficient of materials 110 generating a periodic π-phase change resulting in acoustic wave 124 having a periodic wave front. Material 110 may be effective to integrate electric field source 106 and to integrate a grating function to generate a spatial field with periodic pressure features including pressure maxima and minima as shown in graph 122. Graph 122 illustrates an example acoustic intensity as it changes along an x-axis ("Lateral Position) and along a z-axis ("z distance") from material 110. Graph 122 illustrates the periodic changes in pressure maxima and minima in accordance with changes in the z distance and lateral position. Pressure distribution of an acoustic field produced by acoustic wave 124 may vary in accordance with the z distance. A self-imaging or Talbot effect may be observed where, at a Talbot distance, a duplicated image of the acoustic intensity of wave 124 at material 110 (a z=0 distance) may be periodically duplicated. A single driving frequency from electric field source 106 may produce many different periodically distributed standing acoustic fields as shown in graph 122.

Particles 128 may agglomerate around pressure minima produced by particle removal device 130. Because of, at least in part, the pressure distribution of the acoustic fields of waves 124 along the z-axis 134, particles of various sizes may agglomerate into particle agglomeration 132. Table 120 may be controlled, such as by processor 184 through communication link 186, to move particle removal device 130 along z-axis 134 so that the acoustic fields from wave 124 move. This movement along z-axis 134 may cause pressure minima and maxima to change location, agglomerating and producing larger and/or more numbers of particle agglomerations 132. Similarly, table 120 may move particle removal device 130 along x-axis 136 so that the acoustic fields from wave 124 move. This movement along x-axis 136 may cause pressure minima and maxima to change location, agglomerating and producing larger and/or more numbers of particle agglomeration 132. Movement along z-axis 134 and/or x-axis 136 may similarly facilitate removal of particle agglomeration 132 from region 102 by moving particle agglomeration 132 toward an outside of region 102.

In an example, material 110 may include periodically poled lithium niobate. Upon application of electric field 138, periodically poled lithium niobate may produce a periodic distributed acoustic field as acoustic wave 124 propagates along the z-axis. As an example, wave 124 where z=0 may be expressed as:

$$U(x, y, 0) = T(u, v) = \begin{cases} Ae^{i\omega t} & u \in (n\Lambda, (2n+1)\Lambda/2), \\ -Ae^{i\omega t} & u \in ((2n-1)\Lambda/2, n\Lambda). \end{cases}$$

where

T(u,v) is the acoustic field distribution at the z=0 plane, u and v are coordinates at z=0 replacing x and y, and Λ is the period of the wave.

The Fourier transform of T(u,v) is $$T(u, v) = \sum_{n=-\infty}^{+\infty} a_n \exp\left(in\frac{2\pi}{\Lambda}u\right)$$

where n is the Fourier series with $$a_n = Ae^{j\omega t}(1-\cos n\pi)/in\pi$$

so that when n is odd, $a_n=2Ae^{j\omega t}/in\pi$ and when n is even, $a_n=0$.

Based on the generalized Fresnel-Kirchhoff diffraction integral, the spatially acoustic field distribution is $$U(x, y, z) \propto \frac{i}{\lambda z}\int\int T(u, v)\exp(-ikr)dudv$$

where k=2π/λ is the wave vector.

In the far field, where z is relatively large, the field may be simplified as $$U(x,y,z)\propto\frac{i}{\lambda z}\exp\left(-ik\left(z+\frac{x^2+y^2}{2z}\right)\right)\times\int_{-\infty}^{+\infty}T(u,v)\exp\left(-\frac{ik}{2z}u^2+i\frac{kx}{z}u\right)du\int_{-\infty}^{+\infty}\exp\left(-\frac{ik}{2z}v^2+i\frac{ky}{z}v\right)dv,$$

$$=\exp(-ikz)\sum_{n=-\infty}^{+\infty}a_n\exp\left(i\pi\lambda\frac{n^2}{\Lambda^2}z\right)\exp\left(i\frac{2n\pi}{\Lambda}x\right).$$

The acoustic field of wave 124 at distance z becomes $$U(x,y,z)=\frac{2A\exp(i(\omega t-kz))}{i\pi}\sum_{n=-\infty}^{+\infty}\frac{1}{2n+1}\exp\left(i\pi\lambda\frac{(2n+1)^2}{\Lambda^2}z\right)\exp\left(i\frac{2(2n+1)\pi}{\Lambda}x\right),$$

$$=\frac{4A\exp(i(\omega t-kz))}{\pi}\sum_{n=0}^{+\infty}\frac{1}{2n+1}\sin\left(\frac{2(2n+1)\pi}{\Lambda}x\right)\exp\left(i\pi\lambda\frac{(2n+1)^2}{\Lambda^2}z\right).$$

In an example, a period of periodically poled $LiNbO_3$ was set to about 0.507 mm, with a wafer thickness of about 0.5 mm. A resonance frequency of the material was 7.2 MHz·mm, an acoustic wavelength λ of 0.0514 mm and a Talbot distance was found to be 10 mm.

Among other potential benefits, a system in accordance with the disclosure may be able to remove particles, such as for example, particles from a combustion engine, from a region using an acoustic wave without a resonance chamber. The standing wave acoustic pattern may be tunable based on a distance from the particle removal device facilitating agglomeration and removal. Particle agglomerations may be moved by moving the particle removal device laterally facilitating subsequent removal such as with a particle separator.

Figure 2:
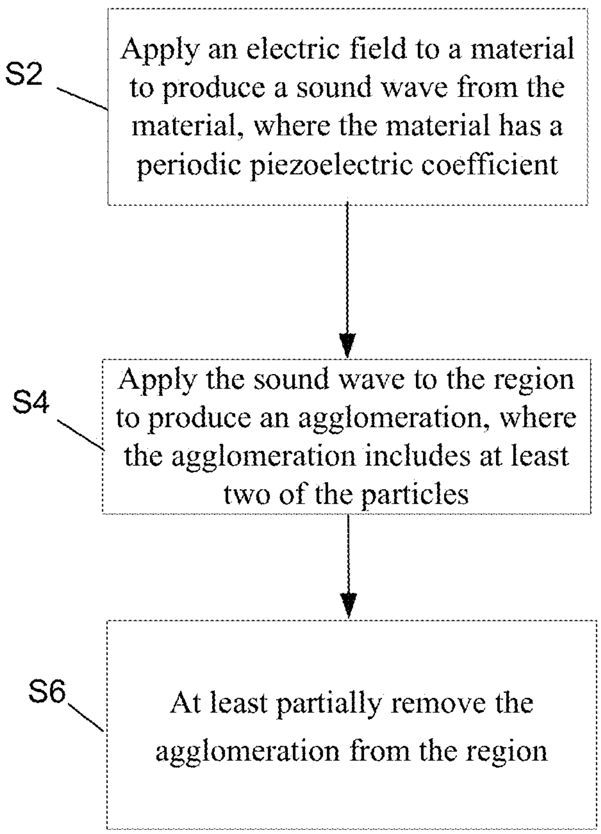
FIG. 2 depicts a flow diagram for an example process for implementing particle removal.

FIG. 2 depicts a flow diagram for an example process for implementing particle removal in accordance to at least some embodiments described herein. The process in FIG. 2 could be implemented using, for example, system 100 discussed above. An example process may include one or more operations, actions, or functions as illustrated by one or more of blocks S2, S4 and/or S6. Although illustrated as discrete blocks, various blocks may be divided into additional blocks, combined into fewer blocks, or eliminated, depending on the desired implementation.

Processing may begin at block S2, "Apply an electric field to a material to produce an acoustic wave from the material, where the material has a periodic piezoelectric coefficient." At block S2, an electric field may be applied to a material with a periodic piezoelectric coefficient to produce an acoustic wave. For example, an electric field in the radio frequency range such as about 1 MHz to about 100 MHz may be applied to a material such as periodically poled lithium tantalate, periodically poled potassium totanyl phosphate, periodically poled rubidium titanyl arsenate, periodically poled barium sodium niobate, or combinations thereof.

Processing may continue from block S2 to block S4, "Apply the acoustic wave to the region to produce an agglomeration, where the agglomeration includes at least two of the particles". At block S4, the acoustic wave may be applied to a region to produce an agglomeration. For example, the acoustic wave may include an acoustic field with pressure minima and maxima and the agglomeration may be produced in one of the pressure minima.

Processing may continue from block S4 to block S6, "At least partially remove the agglomeration from the region." At block S6, the agglomeration may be at least partially removed from the region. For example, a table in contact with the material may be moved in one or more directions with respect to the region and/or a particle separator may be used to at least partially remove the agglomeration from the region.

Figure 3:
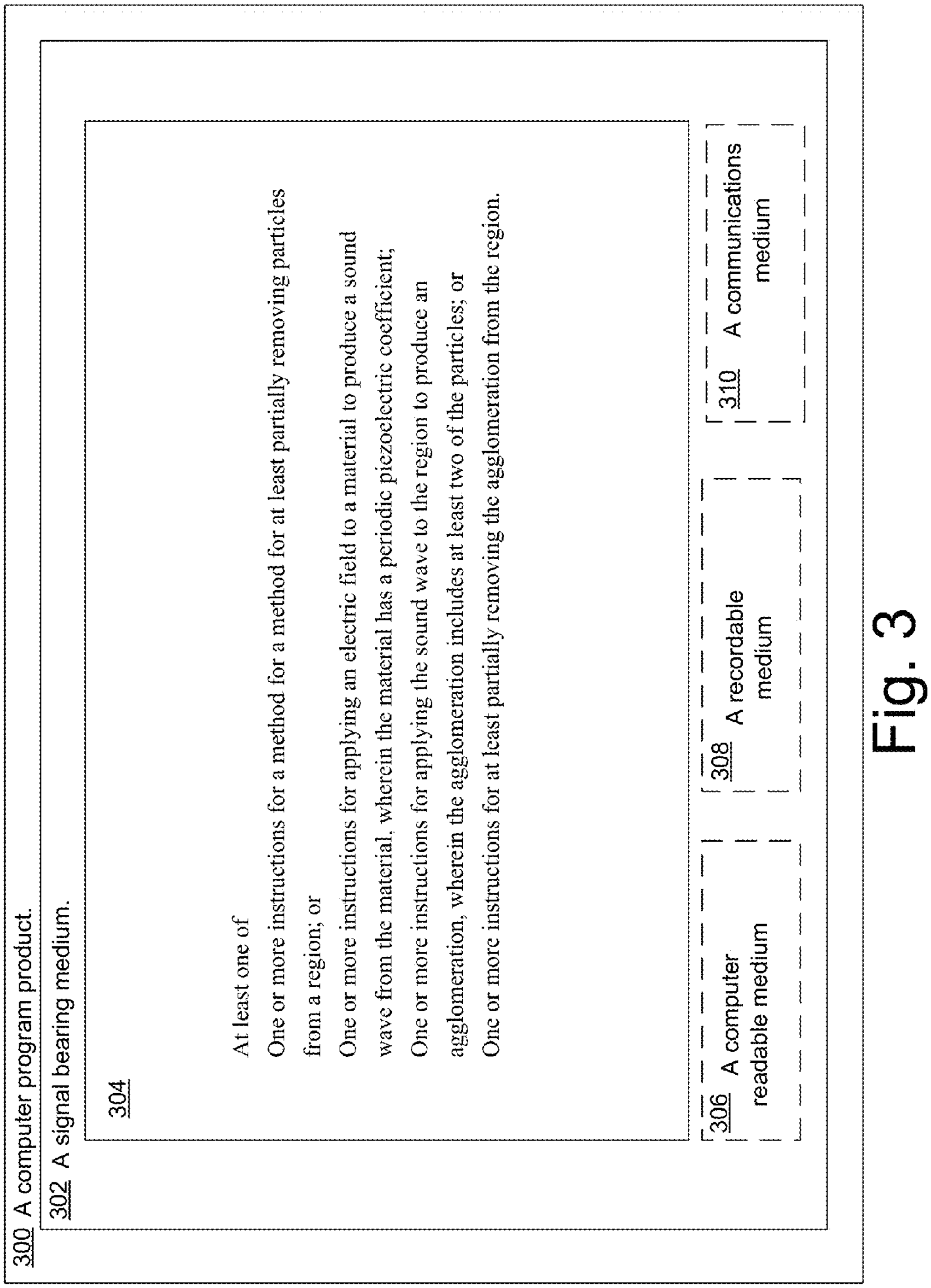
FIG. 3 illustrates a computer program product that can be used to implement particle removal.

FIG. 3 illustrates an example computer program product 300 for implementing particle removal in accordance with at least some embodiments described herein. Computer program product 300 may include a signal bearing medium 302. Signal bearing medium 302 may include one or more instructions 304 that, when executed by, for example, a processor, may provide at least some of the functions described above with respect to FIGS. 1-2. Thus, for example, processor 184 may undertake one or more of the blocks shown in FIG. 3 in response to instructions 304 conveyed to the system 100 by signal bearing medium 302.

In some implementations, signal bearing medium 302 may encompass a computer-readable medium 306, such as, but not limited to, a hard disk drive (HDD), a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communication link, a wireless communication link, etc.). Thus, for example, computer program product 300 may be conveyed to one or more modules of a filter by an RF signal bearing medium 302, where the signal bearing medium 302 is conveyed by a wireless communications medium 310 (e.g., a wireless communications medium conforming with the IEEE 802.11 standard).

Figure 4:
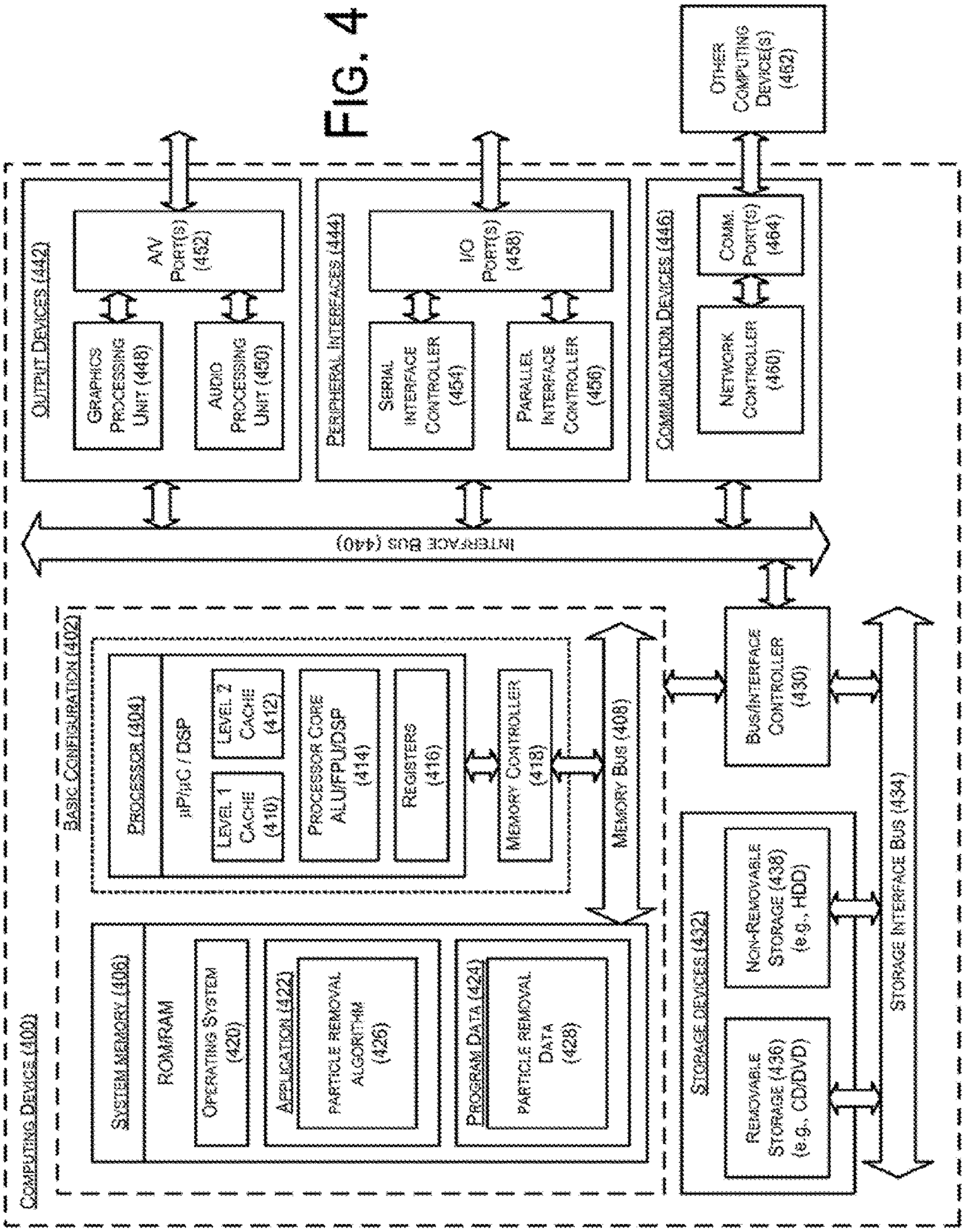
FIG. 4 is a block diagram illustrating an example computing device that is arranged to implement particle removal, all arranged according to at least some embodiments described herein.

FIG. 4 is a block diagram illustrating an example computing device 400 that is arranged to implement particle removal in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a particle removal algorithm 426 that is arranged to perform the functions as described herein including those described previously with respect to FIGS. 1-3. Program data 424 may include particle removal data 428 that may be useful for particle removal as is described herein. In some embodiments, application 422 may be arranged to operate with program data 424 on operating system 420 such that a particle removal may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

EXAMPLES

Example 1: Assembly of Device

A device in accordance with the disclosure may be assembled by using a power source and electric field source to form a Radio Frequency source. Copper wires may communicate the Radio Frequency source with the material. The material may be periodically poled $LiNbO_3$. Electrode 112 and 118 may be made of silver and substrate 114 may be a ceramic.

Example 2: Assembly of a System to Clean Air Using Talbot Effect

The acoustic Talbot device described in Example 1 could be mounted on a moving stage or rail and may be used to clean a region of air by moving the device with respect to the region.

Example 3: Use of System to Remove Nanoparticles from Waste Air Stream

An acoustic Talbot device as described in Example 1 may be installed in a larger system. After installation, the device can move freely according to a predesigned route of the larger system to agglomerate nanoparticles in a specific region. Then, the agglomeration can be further removed by other cleaners. The system may be used to agglomerate nanoparticles from waste air such as vehicle exhaust or clean room/chamber.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to at least partially remove particles from a region, the method comprising:

applying an electric field to a material to produce tunable periodically distributed standing acoustic fields from the material by utilizing an acoustic Talbot effect, wherein each standing acoustic field of the standing acoustic fields comprises pressure maxima and pressure minima, and wherein the material has a periodic piezoelectric coefficient;

applying the standing acoustic fields to the region to produce a first agglomeration, wherein the first agglomeration includes at least two of the particles;

moving the material to modify a location of the pressure maxima and the pressure minima of each of the standing acoustic fields with respect to the region to produce second agglomerations in the region; and at least partially removing at least one agglomeration from the region, wherein the at least one agglomeration that is at least partially removed includes the first agglomeration and/or one of the second agglomerations.

2. The method of claim 1, wherein moving the material comprises:

moving the material with respect to the region in a first direction to produce the second agglomerations in the region; and moving the material with respect to the region in a second direction to move the second agglomerations toward an outside of the region.

3. The method of claim 1, wherein:

the first agglomeration is produced in one of the pressure minima.

4. The method of claim 1, wherein at least partially removing the at least one agglomeration from the region includes at least partially removing the at least one agglomeration using a particle separator.

5. The method of claim 1, wherein each of the at least two of the particles has at least two physical dimensions that are within a range of about 1 nm to about 100 nm.

6. The method of claim 5, wherein the particles originate from a combustion engine.

7. The method of claim 1, wherein the first agglomeration is between about 100 nm and about 1000 nm.

8. The method of claim 1, wherein moving the material includes moving material that includes periodically poled lithium niobate.

9. The method of claim 1, wherein moving the material includes moving material that includes at least one of periodically poled lithium tantalate, periodically poled potassium totanyl phosphate, periodically poled rubidium titanyl arsenate, periodically poled barium sodium niobate, or combinations thereof.

10. The method of claim 1, wherein applying the electric field includes applying an electric field with a frequency of about 1 MHz to about 100 MHz.

11. The method as recited in claim 10, wherein applying the electric field includes applying an electric field with a frequency of about 7.2 MHz, and wherein applying the standing acoustic fields includes applying an acoustic wave with a frequency of about 7.2 MHz.

12. The method of claim 1, wherein:

each of the at least two particles has at least two physical dimensions that are about 1 nm to about 100 nm, moving the material includes moving material that includes at least one of periodically poled lithium niobate, periodically poled lithium tantalate, periodically poled potassium totanyl phosphate, periodically poled rubidium titanyl arsenate, periodically poled barium sodium niobate, or combinations thereof, applying the electric field includes applying an electric field with a frequency in a range of about 1 MHz to about 100 MHz, the first agglomeration is produced in one of the pressure minima, moving the material comprises:

moving the material with respect to the region in a first direction to produce the second agglomerations in the region; and moving the material with respect to the region in a second direction to move the second agglomerations toward an outside of the region, and at least partially removing comprises:

removing the at least one agglomeration from the region using a particle separator.

13. A device effective to at least partially remove particles from a region, the device comprising:

an electric field source effective to produce an electric field;

a material in communication with the electric field source, wherein:

the material is effective to receive the electric field and produce periodically distributed standing acoustic fields in response, the material has a periodic piezoelectric coefficient, the standing acoustic fields are effective to be applied to the region to produce a first agglomeration, and the first agglomeration includes at least two of the particles; and a table in contact with the material, wherein the table is effective to:

move the material with respect to the region in a first direction to produce second agglomerations in the region; and move the material with respect to the region in a second direction to move the second agglomerations toward an outside of the region.

14. The device of claim 13, further comprising a housing, wherein the region is outside of the housing.

15. The device of claim 13, further comprising:

a first electrode in communication with the material and in communication with the electric field source;

a second electrode in communication with the material and in communication with the electric field source; and a support in contact with the second electrode.

16. The device of claim 13, wherein the material includes at least one of periodically poled lithium niobate, periodically poled lithium tantalate, periodically poled potassium totanyl phosphate, periodically poled rubidium titanyl arsenate, periodically poled barium sodium niobate, or combinations thereof.

17. The device of claim 13, wherein:

the standing acoustic fields include pressure minima and maxima, and the first agglomeration is produced in one of the pressure minima.

18. A system effective to at least partially remove particles, the system comprising:

an electric field source effective to produce an electric field;

a material in communication with the electric field source, wherein the material is effective to receive the electric field and produce periodically distributed standing acoustic fields in response, and wherein the material has a periodic piezoelectric coefficient;

a region in acoustic communication with the material, wherein the region is effective to receive the standing acoustic fields, wherein the region includes the particles and at least one first agglomeration, and wherein the at least one first agglomeration includes at least two of the particles; and a table in contact with the material, wherein the table is effective to:

move the material with respect to the region in a first direction to produce second agglomerations in the region; and move the material with respect to the region in a second direction to move the second agglomerations toward an outside of the region.

19. The system of claim 18, further comprising a particle separator, wherein the particle separator is effective to at least partially remove at least one agglomeration from the region, and wherein the at least one agglomeration that is at least partially removed includes the at least one first agglomeration and/or one of the second agglomerations.

20. The system of claim 18, wherein the material includes at least one of periodically poled lithium tantalate, periodically poled potassium totanyl phosphate, periodically poled rubidium titanyl arsenate, periodically poled barium sodium niobate, or combinations thereof.

21. A method to at least partially remove particles from a region, the method comprising:

applying an electric field to a material to produce periodically distributed standing acoustic fields from the material by utilizing an acoustic Talbot effect, wherein the material has a periodic piezoelectric coefficient;

applying the standing acoustic fields to the region to produce a first agglomeration, wherein the first agglomeration includes at least two of the particles;

moving a table in contact with the material to modify a location of pressure maxima and pressure minima of each of the standing acoustic fields with respect to the region to produce second agglomerations in the region, wherein the table is effective to:

move the material with respect to the region in a first direction to produce the second agglomerations in the region; and move the material with respect to the region in a second direction to move the second agglomerations toward an outside of the region; and at least partially removing at least one agglomeration from the region, wherein the at least one agglomeration that is at least partially removed includes the first agglomeration and/or one of the second agglomerations, and wherein:

the standing acoustic fields provide a standing acoustic wave pattern that is tunable, the first agglomeration is produced in one of the pressure minima, and the material includes a combination of at least two of periodically poled lithium niobate, periodically poled lithium tantalate, periodically poled potassium totanyl phosphate, periodically poled rubidium titanyl arsenate, and periodically poled barium sodium niobate.

* * * * *